United States Patent [19]

Sudol et al.

[11] Patent Number: 4,631,608
[45] Date of Patent: Dec. 23, 1986

[54] DISK DRIVE DISK CONTROL APPARATUS

[75] Inventors: George A. Sudol, Mine Hill, N.J.; Edward H. Comfort, Morrisville, Pa.; Stephen R. Solomon, Cranford, N.J.

[73] Assignee: Burroughs Corporation, Detroit, Mich.

[21] Appl. No.: 633,634

[22] Filed: Jul. 23, 1984

[51] Int. Cl.⁴ .............................................. G11B 5/016
[52] U.S. Cl. ..................................................... 360/99
[58] Field of Search ........................... 360/97, 99, 133

[56] References Cited

U.S. PATENT DOCUMENTS

| | | | |
|---|---|---|---|
| 3,770,908 | 11/1973 | Craggs | 360/97 |
| 3,891,796 | 6/1975 | Takahara et al. | 360/99 X |
| 3,959,823 | 5/1976 | Heidecker et al. | 360/99 |
| 4,445,156 | 4/1984 | Fujimoto | 360/99 |

Primary Examiner—John H. Wolff
Attorney, Agent, or Firm—Francis A. Varallo; Kevin R. Peterson

[57] ABSTRACT

A disk drive having a slot for receiving a disk and a knob for causing a leading head to engage the disk in which the knob includes means for holding the disk securely inserted in the disk drive.

4 Claims, 3 Drawing Figures

DISK DRIVE DISK CONTROL APPARATUS

BACKGROUND OF THE INVENTION

Data processing systems include a disk drive assembly comprising a housing having a slot for receiving a magnetic disk and containing electronic apparatus for recording on the disk or reading data recorded on the disk. The assembly includes an external knob which is coupled to, and operates, a magnetic head inside the housing for engaging the disk.

One problem with this arrangement is that the disk does not always seat properly when inserted and may be damaged by the head. The present invention provides a solution to this problem.

DESCRIPTION OF THE INVENTION

Figure 1:
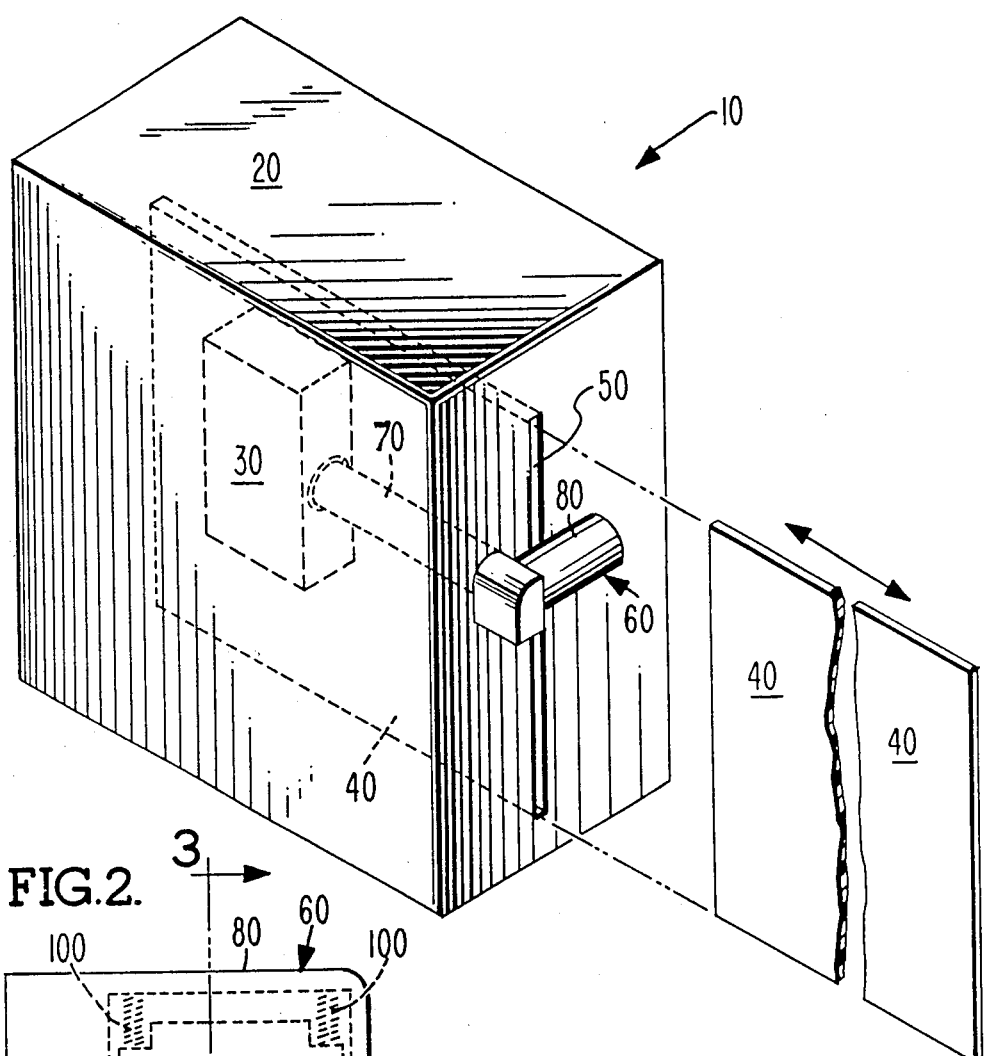
FIG. 1 is a perspective view of a disk drive embodying the invention.

A disk drive 10, shown schematically in FIG. 1, comprises a housing 20 containing electronic apparatus 30 for recording and reading data on a magnetic disk 40 comprised of a magnetic disk disposed within a protective cover. The housing includes a slot 50 for receiving the diskette 40 and an external knob 60 coupled by shaft 70 internally to a magnetic head and spindle clamp assembly which are part of apparatus 30. The coupling of shaft 70 to apparatus 30 is such that selective rotation of knob 60 brings the last mentioned assembly into and out of engagement with the magnetic disk.

Figure 2:
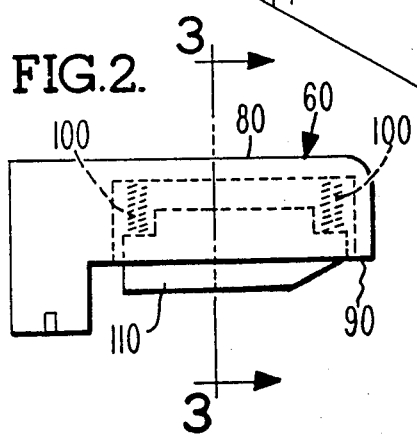
FIG. 2 is a side elevational view of a portion of the apparatus of FIG. 1.
Figure 3:
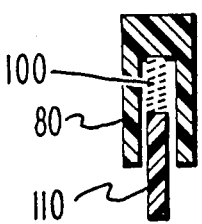
FIG. 3 is a sectional view along the lines 3—3 in FIG. 2.

According to the invention as seen particularly in FIGS. 2 and 3, the knob 60 includes a relatively flat, finger-engaging operating portion 80 which includes a slot 90 in which two helical springs 100 are inserted first, and then a thin plate 110 is inserted into the slot and rests on and engages the springs and is urged outwardly toward the housing 20 by the springs. After knob 60 has been installed on shaft 70, plate 110 is retained within slot 90 by virtue of its physical contact with the surface of housing 20. Springs 100 are partially compressed by plate 110 as seen in FIG. 2, and the latter plate maintains an exposed posture relative to the surface of finger-engaging portion 80 from which it protrudes. Thus, the forward edge of plate 110 wipes the housing surface during rotation of knob 60 as described hereinafter.

In operation of the invention, the finger-engaging portion 80 of knob 60 is initially oriented such that the entrance to slot 50 is unobstructed, thereby providing access thereto for diskette 40. A diskette 40 is inserted into the slot 50. The operator then rotates the finger-engaging portion 80 of knob 60 toward a position transverse to slot 50 in order to cause the head and spindle clamp assembly to engage the magnetic disk. If the diskette is not fully inserted that is, if the trailing edge of diskette 40 protrudes an appreciable distance from the housing 20, then the protruding plate 110 strikes the diskette and prevents the knob from being rotated. If the diskette 40 appears to be completely inserted, but in fact is not, the knob can be rotated fully, as plate 110 engages the trailing edge of the diskette, aided by its chamfered extremity, and the tolerance provided by springs 100. The plate 110 is pushed outwardly by the compressive force of springs 100, bears against the diskette and insures its full and proper insertion into, and retention within, the slot so that it can be properly engaged by the head and spindle clamp assembly.

What is claimed is:

1. A magnetic disk drive for data processing apparatus comprising a housing;

electronic apparatus in said housing for engaging a magnetic disk and reading information on said disk;

an operating knob positioned outside said housing, a shaft rotatably disposed in said housing for coupling said knob to said electronic apparatus, whereby the concurrent rotation of said knob and said shaft causes said electronic apparatus to selectively engage and disengage said magnetic disk; and a first slot in said housing into which a diskette including said magnetic disk can be inserted;

said knob including a finger-engaging portion having a second slot, a plate loosely seated in said slot, spring means disposed in said second slot, said plate having a pair of opposed edges, a first of said edges contacting and compressing said spring means and a second of said edges being urged against the surface of said housing adjacent said first slot by said spring means, said knob being positioned such that, when it rotates, it tends to traverse said first slot, whereby if said diskette is only partially inserted in said first slot, said plate impacts said diskette and prevents said knob from fully rotating, thereby precluding engagement of said magnetic disk by said electronic apparatus, or, if said diskette is substantially but not fully inserted in said first slot, said plate pushes against the trailing edge of said diskette, fully seating and maintaining the latter properly within said first slot and inside said housing.

2. A magnetic disk drive as defined in claim 1 wherein said second of said edges of said plate is chamfered at the extremity thereof which comes into initial contact with said diskette during rotation of said knob, whereby engagement of said plate with said trailing edge of said diskette is facilitated.

3. A magnetic disk drive as defined in claim 2 characterized in that said knob includes a relatively flat, finger-engaging portion containing said second slot.

4. A magnetic disk drive as defined in claim 3 further characterized in that said spring means includes a pair of coil springs disposed at opposite extremities of said slot in said finger-engaging portion, said plate having a pair of notches at opposite extremities of said first of said edges for receiving said springs.

* * * * *